US006390820B1

(12) United States Patent
Landman

(10) Patent No.: US 6,390,820 B1
(45) Date of Patent: May 21, 2002

(54) SYSTEM FOR TREATMENT OF DEVELOPMENTAL VERBAL APRAXIA

(76) Inventor: Chana Landman, 180 W. End Ave., New York, NY (US) 10023

( * ) Notice: Subject to any disclaimer, the term of this patent is extended or adjusted under 35 U.S.C. 154(b) by 0 days.

(21) Appl. No.: 09/488,486

(22) Filed: Jan. 20, 2000

Related U.S. Application Data

(60) Provisional application No. 60/129,940, filed on Apr. 19, 1999.

(51) Int. Cl.[7] .............................................. G09B 21/00
(52) U.S. Cl. ....................... 434/112; 434/116; 434/172; 434/178; 273/299
(58) Field of Search ................................ 434/112, 116, 434/128, 129, 178, 185, 180, 167, 171, 172; 273/440, 292, 307, 302, 299

(56) References Cited

U.S. PATENT DOCUMENTS

| 3,453,750 A | * | 7/1969 | Rapaport ..................... 434/172 |
| 4,934,709 A | * | 6/1990 | Peterson ..................... 273/249 |
| 4,991,854 A | * | 2/1991 | Weiss ......................... 273/249 |
| 5,788,503 A | * | 8/1998 | Shapiro et al. ............. 434/172 |
| 5,803,742 A | * | 9/1998 | Buti ............................ 434/157 |
| 6,056,549 A | * | 5/2000 | Fletcher ...................... 434/112 |

* cited by examiner

Primary Examiner—Kien T. Nguyen
(74) Attorney, Agent, or Firm—Gottlieb, Rackman & Reisman, P.C.

(57) ABSTRACT

A system or kit for treating developmental verbal apraxia is provided. The system or kit includes a plurality of picture cards in which each card identifies in written, spelled-out form a selected multi-syllabic word for describing an activity, item or thing with a corresponding drawing or picture which illustrates the activity, item or thing. In addition, each card also includes, in written, spelled-out form, a series of single syllabic words in written, spelled-out form, each word describing an activity, item or thing. Associated with each single syllabic word is preferably a drawing or picture which illustrates the activity, item or thing.

5 Claims, 6 Drawing Sheets

TABLE
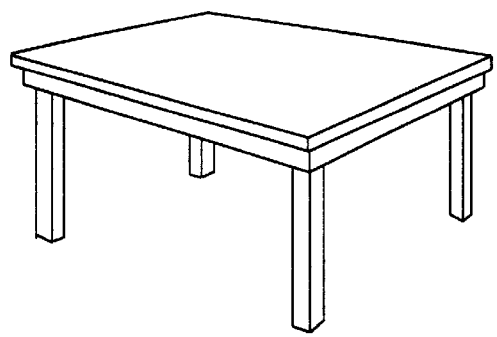
18A
TAKE                                    BALL
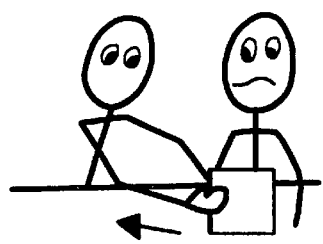                    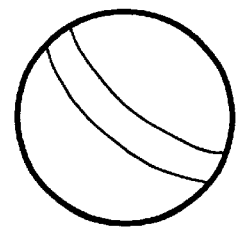
FIG. 2      13A

MAILBOX
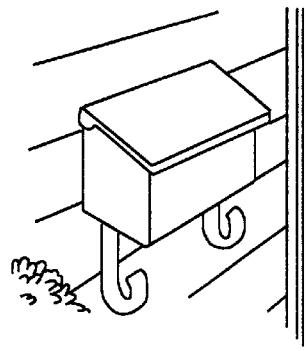
18B
MAIL  BOX 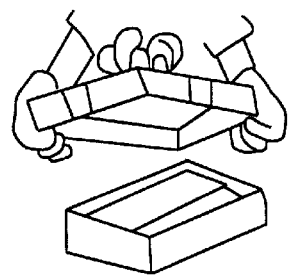
FIG. 3   13B

PEANUT BUTTER
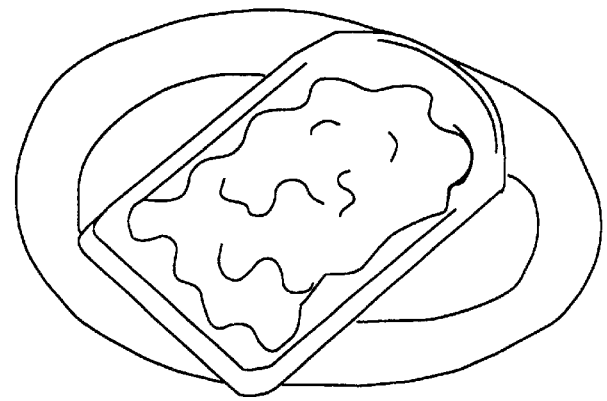
18C
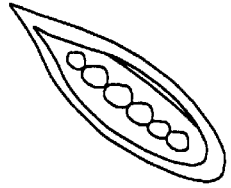  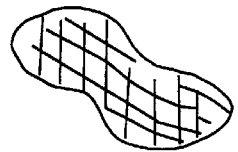  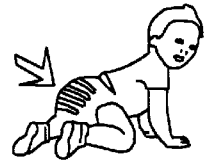  
PEA     NUT     BUTT     HER
*FIG. 4*   13C

POTATO
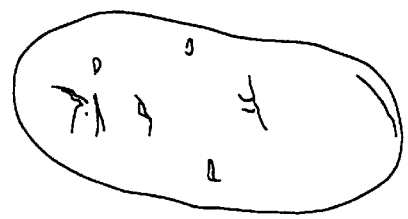
18D
PUT       A       TOE
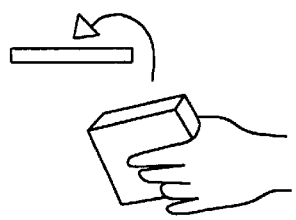  A  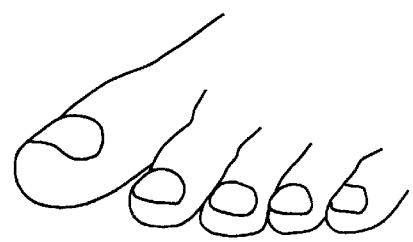
FIG. 5  13D

KETCHUP
18E
CATCH UP
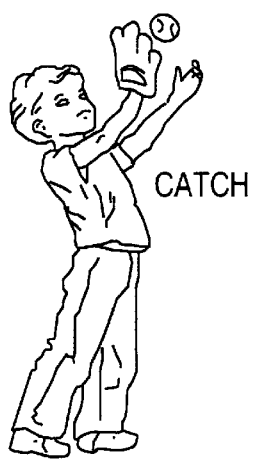
CATCH
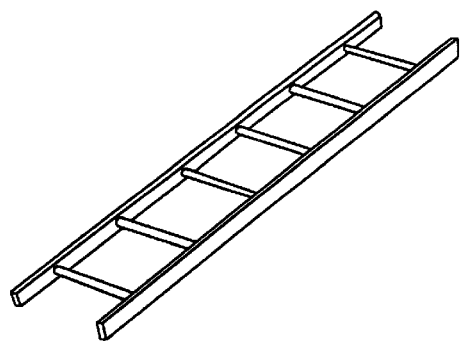
FIG. 6  13E

SYSTEM FOR TREATMENT OF DEVELOPMENTAL VERBAL APRAXIA

This application claims benefit of Provisional Application No. 60/129,940 filed Apr. 19, 1999.

BACKGROUND OF THE INVENTION

This invention relates to a system for the treatment of developmental verbal apraxia, and more particularly, to a therapy kit and process for the treatment of development verbal apraxia.

Verbal apraxia is a central neurological speech disorder that affects the oral articulatory musculature. A child having this disorder is unfortunately unable to organize his or her oral muscles in order to produce speech sounds in isolation—to sequence speech sounds (consonants and vowels in words), and finally to sequence the words into sentences.

The therapy process of the invention was developed in order to treat children exhibiting developmental verbal apraxia who have begun to use single words, but are unable to sequence the various consonants found in bi-syllabic or multi-syllabic words. Children exhibiting verbal apraxia often present a tendency to simplify words by using the same consonants in bi-syllabic or multi-syllabic words, rather than correctly using different consonants.

SUMMARY OF THE INVENTION

Generally speaking, in accordance with the invention, a system or kit for treating developmental verbal apraxia is provided. The system or kit includes a plurality of picture cards in which each card identifies in written, spelled-out form a selected multi-syllabic word for describing an activity, item or thing with a corresponding drawing or picture which illustrates the activity, item or thing. In addition, each card also includes, in written, spelled-out form, a series of single syllabic words in written, spelled-out form, each word describing an activity, item or thing. Associated with each single syllabic word is preferably a drawing or picture which illustrates the activity, item or thing.

In accordance with the invention, each single syllabic words has a sound which, when taken together with the other single syllabic words written on the card, facilitates sounding out the multi-syllabic word.

Alternatively, instead of a single picture card for identifying the selected multi-syllabic word as well as the series of single syllabic words for sounding out the multi-syllabic word, there can be provided a single card for identifying the single syllabic word, and a separate series of associated cards which identify the single syllabic words that, when combined, enables one to sound out the multi-syllabic word.

Accordingly, it is an object of the invention to provide a system or kit that is suitable for treating developmental verbal apraxia.

Another object of the invention is to provide a system or kit for the treatment of developmental verbal apraxia which utilizes one or more picture cards.

A further object of the invention is to provide a system or kit for the treatment of developmental verbal apraxia which utilizes colorful picture cards for breaking down, pictorially, a multi-syllabic word into a series of single syllabic words.

Still other objects and advantages of the invention will in part be obvious, and will in part be apparent from the following description.

BRIEF DESCRIPTION OF THE DRAWINGS

For a fuller understanding of the invention, reference is made to the following description, taken in connection with the accompanying drawings, in which:

FIGS. 2–6 are top plan views of various examples of picture cards that may be incorporated in the inventive system or kit.

DETAILED DESCRIPTION OF THE PREFERRED EMBODIMENT

Figure 1:
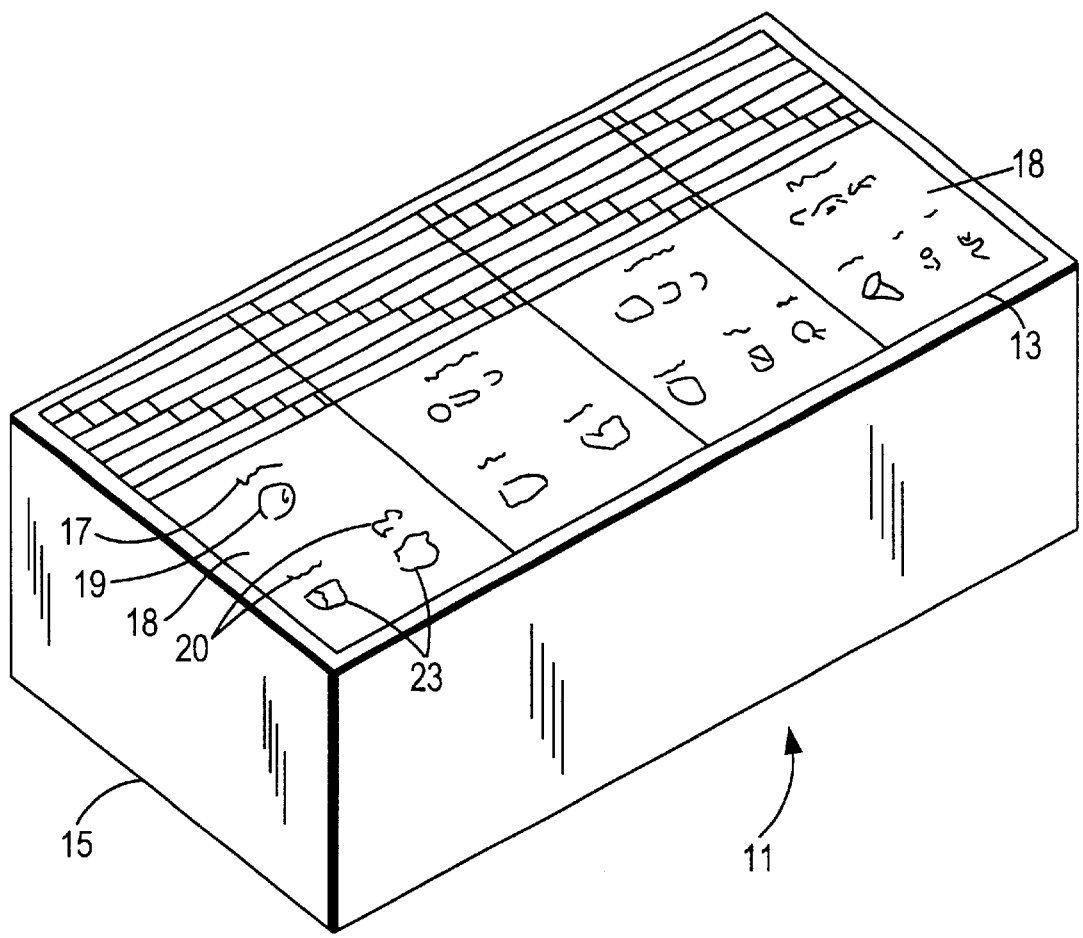
FIG. 1 is a perspective view of a kit or box containing a plurality of picture cards suitable for use in treating developmental verbal apraxia.

Referring first to FIG. 1, a kit for use in the treatment of developmental verbal apraxia is shown, and generally indicated at 11. Kit 11 comprises a box 15 which contains a plurality of cards 13. Each card 13 has a front face 18 which identifies in written, spelled-out form, a selected multi-syllabic word 17 describing an activity, item or thing and a corresponding drawing or picture 19 which illustrates the activity, item or thing. As shown in FIG. 1, words 17 and drawing or picture 19 are located on the upper portion of face 18 of card 13, with picture 19 located directly below word 17.

In addition, face 18 of card 13 includes, in written, spelled-out form, a series of single syllabic words 21. Each of words 21 describes an activity, item or thing, and each of words 21 has an associated or corresponding drawing or picture 23 illustrating the activity, item or thing described by each word 21. As shown in FIG. 1, each of single syllabic words 21 and its associated drawing or picture 23 is located along the bottom portion of face 18 of card 13.

Significantly, as shown in more detail later on, each single syllabic word 21 has a sound which, when taken together with the other single syllabic words 21, facilitates. sounding out multi-syllabic word 17.

Turning now to FIG. 2, one of cards 13A that may be used as part of kit 11 is shown. Card 13A has a front face 18A. As shown, the top portion of face 18A identifies in written, spelled-out form, the multi-syllabic word "TABLE," with a corresponding drawing or picture located therebelow which illustrates a table. Also, along the lower portion of front face 18A of card 13A, there is provided in written, spelled-out form, the single syllabic words "TAKE" and "BALL," with a corresponding drawing illustrating each of these single syllabic words.

In use, card 13A is shown to a child. The child is first pointed to-the picture of the "TABLE" and to the two pictures showing "TAKE" and "BALL"—at the same time, the therapist says the word "TAKE" and the word "BALL." Once this is done, the therapist encourages the child to say both the word "TAKE" and the word "BALL." Finally, the therapist points back to the picture of the "TABLE" and tries to get the child to say, very slowly, "TA . . . BAL."

As can be appreciated, by breaking down the multi-syllabic word TABLE into the single syllabic words "TAKE" and "BALL," with corresponding pictures associated with these single syllabic words, the therapist will be able to faciliate the child's sounding out the more complicated multi-syllabic word "TABLE." Obviously, the procedure described above can be repeated until the child is more comfortable with saying the multi-syllabic word "TABLE." The advantage to using card 13A of the inventive system is that it will be easier for a child with verbal apraxia to say the word "TABLE" (or any other multi-syllabic word) as its various consonants. That is, instead of a child incorrectly saying "BABLE," or "TADEL," the child, by utilizing the inventive system, will vary the consonants in the word "TABLE" appropriately, using the consonant-vowel syllable "TA" from the word "TAKE," followed by the syllable "BLE" from the word "BALL" to make the word "TABLE."

Other examples of cards suitable for use in the inventive system are cards 13B shown in FIG. 3, 13C shown in FIG. 4, 13D shown in FIG. 5, and 13E shown in FIG. 6. Card 13B of FIG. 3 has a front-face 18B and the top of front face 18B identifies in a written, spelled-out form the multi-syllabic word "MAILBOX," with a corresponding drawing of a mailbox illustrated below the word. Along the bottom portion of front face 18B of card 13B, the single syllabic words "MAIL" and "BOX" are written in spelled-out form with each having a corresponding picture for the word located below.

In FIG. 4, a third card, 13C, that may be part of the inventive system, is shown and includes a front face 18C. Along the top portion of front face 18C is the written multi-syllabic word "PEANUT BUTTER," with a picture of peanut butter located below the written word. In this type of card, there are four single syllabic words written out along the bottom portion of front face 18C, and each word has an associated picture describing the word located below the spelled out word. As can be appreciated, the four single-syllabic words break down the word "PEANUT" into the words "PEA" and "NUT," and also break down the word "BUTTER" into the words "BUT" and "HER."

Another example of a card suitable for the inventive kit is shown in FIG. 5 and identified as 13D. Card 13D has a front face 18D with the top portion of front face 18D identifying in written, spelled-out form the multi-syllabic word "POTATO" with a corresponding drawing of a "potato" located below the spelled-out word. Along the lower portion of the front face of card 18D is a series of single- syllabic words "PUT," "A" and "TOE"—each of these words has a picture of a drawing below it for describing the word. The word "POTATO" may then be sounded out by the child by the therapist referring to the words and pictures located along the bottom portion of the front face 18D of card 13D.

In FIG. 6, another card 13E, for use as part of the inventive system, is described. Card 13E has a front face 18E and on the top portion thereof is the word "KETCHUP" in written, spelled-out form, and a corresponding drawing located therebelow. On the bottom portion of front face 18E of card 13E are the single-syllabic words "CATCH" and "UP" written in spelled-out form, and pictures below these words as illustrations thereof. As before, a speech therapist can break down the bi-syllabic word "KETCHUP" into two easier words, thereby enabling the child to say the words "KETCHUP" with its various-consonants. Moreover, even though the first vowel of the word "CATCH" does not incorporate the exact target vowel "e," it is more understandable for a child to say "CATCH-UP" for "KETCHUP" than simply trying to say the word "KETCHUP" without using the inventive technique. Obviously, with time and repetition, the child will begin to use the appropriate vowel sound.

Although the specific embodiments described herein utilize a single card for describing both the selected multi-syllabic word and the series of single syllabic words that are used to sound out the multi-syllabic word, the inventive system may be practiced by having a separate card for the multi-syllabic word that is to be sounded out, and a separate card for each single syllabic word, or a single card for the series of single syllabic words.

In some situations, a consonant or vowel that needs to be sounded out by the child may be very difficult to reproduce pictorially. In those situations, the consonant or vowel may be printed in a written form without any accompanying corresponding picture.

Accordingly, the therapy process carried out by utilizing the inventive system or kit can simplify the production of complex words in order to make it easier for a child to verbally say these words. In particular, the inventive process breaks up more complex words, bi-syllabic and multi-syllabic words, into mono-syllabic words that are easier to pronounce.

For therapists who treat developmental verbal apraxia, an ecletic therapeutic approach is always deemed desirable. Therefore, a therapist should always use other methods that he or she has learned and/or utilized along with the therapeutic process of the invention, as described above.

Furthermore, the inventive process and technique should be carried out by a therapist repeatedly in order to achieve success.

It will thus be seen that the objects set forth above, among those made apparent from the preceding description, are efficiently attained by the subject invention. Certain changes may be made in carrying out the invention without departing from its spirit and scope. The scope of the invention is recited in the claims found hereinbelow.

What is claimed is:

1. A system for treating developmental verbal apraxia comprising:

a plurality of picture cards, each of said cards identifying, in written, spelled-out form, a different selected multi-syllabic word for describing an activity, item or thing and a corresponding drawing or picture which illustrates said activity, item or thing, each said card also including, in written, spelled-out form, a series of sequentially arranged single syllabic words with each said single syllabic word describing an activity, item or thing, and a corresponding drawing or picture for at least some of said single syllabic words for illustrating said activity, item or thing thereof, wherein each said single syllabic word has a sound when pronounced which, when sequentially combined in pronunciation with the remaining single syllabic words, facilitates sounding out said multi-syllabic word.

2. The system of claim 1, wherein each of said single syllabic words has a corresponding drawing or picture for illustrating said activity, item or thing described by said single syllabic word.

3. A system for treating developmental verbal apraxia comprising:

a plurality of picture cards, said plurality of picture cards including a plurality of corresponding sets of cards;

each corresponding set including a first card for identifying in written, spelled-out form, a selected multi-syllabic word describing an activity, item or thing and a corresponding drawing or picture which illustrates said activity, item or thing;

each set further including a second card which includes in written, spelled-out form, a series of sequentially arranged single syllabic words with each single syllabic word describing an activity, item or thing, and a corresponding drawing or picture for at least some of said single syllabic words that illustrates said activity, item or thing:

wherein each single syllabic word provided on said second related card has a sound when pronounced which, when sequentially combined with the pronounced sounds of the other single syllabic words written on said second card, facilitates sounding out said multi-syllabic word written on said first card.

4. The system of claim 3, wherein each of said single syllabic words has a corresponding drawing or picture for illustrating said activity, item or thing described by said single syllabic word.

5. A system for treating developmental verbal apraxia comprising:

a plurality of picture cards, including a first card identifying in written, spelled-out form, a selected multi-syllabic word for describing an activity, item or thing, and a corresponding drawing or picture on said first card and in association with said multi-syllabic word which illustrates said activity, item or thing;

wherein said plurality of picture cards further includes a corresponding series of sequentially arrangeable second picture cards in which each of said second picture cards identifies, in written, spelled-out form, a unique single syllabic word that describes an activity, item or thing, and a corresponding drawing or picture on said second card and in association with said single syllabic word which illustrates said activity, item or thing;

wherein said single syllabic word identified on any of said second cards has a sound when pronounced which, when sequentially combined in pronunciation with the remaining single syllabic words identified on said other second cards, facilitates sounding out said multi-syllabic word identified on said first card.

\* \* \* \* \*